United States Patent

Braun

(10) Patent No.: US 8,967,879 B2
(45) Date of Patent: Mar. 3, 2015

(54) CAGE FOR ROLLING BODIES OF A BEARING

(75) Inventor: Wolfgang Braun, Garstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 396 days.

(21) Appl. No.: 12/991,171

(22) PCT Filed: Apr. 30, 2009

(86) PCT No.: PCT/DE2009/000627
§ 371 (c)(1),
(2), (4) Date: Nov. 5, 2010

(87) PCT Pub. No.: WO2009/135477
PCT Pub. Date: Nov. 12, 2009

(65) Prior Publication Data
US 2011/0064349 A1 Mar. 17, 2011

(30) Foreign Application Priority Data

May 6, 2008 (DE) .................. 10 2008 022 311

(51) Int. Cl.
*F16C 33/48* (2006.01)
*F16C 33/54* (2006.01)
*F16C 33/46* (2006.01)
*F16C 33/56* (2006.01)

(52) U.S. Cl.
CPC ........... *F16C 33/4635* (2013.01); *F16C 33/565* (2013.01)
USPC .......................................... 384/573; 384/572

(58) Field of Classification Search
CPC .. F16C 33/565; F16C 33/445; F16C 33/4611; F16C 33/4635; F16C 33/44
USPC .................. 384/572, 573, 576, 580, 523, 527
See application file for complete search history.

(56) References Cited

U.S. PATENT DOCUMENTS

| 3,162,493 | A |   | 12/1964 | Hanau |         |
|-----------|---|---|---------|-------|---------|
| 3,771,977 | A |   | 11/1973 | Liu   |         |
| 4,223,963 | A | * | 9/1980  | Glodin et al. | 384/527 |
| 5,352,266 | A |   | 10/1994 | Erb et al. |    |
| 5,433,797 | A |   | 7/1995  | Erb et al. |    |
| 6,764,307 | B2| * | 7/2004  | Metrikin | 433/132 |
| 6,802,651 | B2| * | 10/2004 | Ueda et al. | 384/527 |
| 6,994,475 | B2|   | 2/2006  | Doll et al. |   |

(Continued)

FOREIGN PATENT DOCUMENTS

DE           19 46 535 U    9/1966
DE    10 2005 051 914 A1    5/2007

(Continued)

OTHER PUBLICATIONS

Machine translation of DE 1946535.*

(Continued)

*Primary Examiner* — Marcus Charles
*Assistant Examiner* — Yamilka Pinero Medina
(74) *Attorney, Agent, or Firm* — Simpson & Simpson, PLLC

(57) ABSTRACT

A cage for rolling elements of a bearing, which has a plastic base body and a metal coating fixed to the base body and at least partially covering the the base body. The cage provides mechanical stability, wear-resistance and corrosion resistance. This is achieved by the metal, at least sections, having a nanocrystalline granular structure.

9 Claims, 1 Drawing Sheet

(56) References Cited

U.S. PATENT DOCUMENTS

| | | | |
|---|---|---|---|
| 7,942,583 B2 * | 5/2011 | Hattori et al. | 384/527 |
| 2002/0142264 A1 | 10/2002 | Metrikin | |
| 2004/0179762 A1 | 9/2004 | Doll et al. | |
| 2006/0135282 A1 | 6/2006 | Palumbo et al. | |
| 2007/0281176 A1 | 12/2007 | Palumbo et al. | |

FOREIGN PATENT DOCUMENTS

| | | |
|---|---|---|
| DE | 10 2006 010 171 A1 | 9/2007 |
| DE | 10 2008 002840 A1 | 11/2008 |
| JP | 2001516857 A | 10/2001 |
| JP | 2004308877 A | 11/2004 |
| JP | 2005009636 A | 1/2005 |
| JP | 2005024025 A | 1/2005 |
| JP | 2006083965 A | 3/2006 |
| JP | 2006300257 A | 11/2006 |
| JP | 2007120734 A | 5/2007 |
| JP | 2007177842 A | 7/2007 |
| WO | 2004090361 A2 | 10/2004 |
| WO | 2006066010 A2 | 6/2006 |
| WO | 2007014729 A2 | 2/2007 |

OTHER PUBLICATIONS

English translation of Japanese Office Action dated Jul. 2, 2013.
English translation of Chinese Office Action dated Oct. 29, 2012.

* cited by examiner

CAGE FOR ROLLING BODIES OF A BEARING

This application is a 371 of PCT/DE2009/000627 filed Apr. 30, 2009, which in turn claims the priority of DE 2008 022 311.5 filed May 6, 2008, the priority of both applications is hereby claimed and both applications are incorporated by reference herein.

FIELD OF THE INVENTION

The invention relates to a cage in accordance with the preamble of claim 1 for rolling elements of a bearing, in particular a rolling contact bearing.

Cages are subject to various loads in use, in particular to those of a mechanical or thermal nature, and to wear. Cages composed of metal, especially brass or sheet steel, are known in practice. Metal cages, especially brass cages produced by machining, are very heavy and are expensive to manufacture. Cages composed of a plastic are likewise known in practice. Plastic cages of this kind can be produced quickly and conveniently in large numbers, by injection molding for example, and even complex geometries are possible. However, plastics are not dimensionally stable, especially at high temperatures.

DE 1 946 535 U describes a cage for a rolling contact bearing, the cage having a main body composed of a plastic and the main body being covered completely by a metal coating, in particular one composed of aluminum, the coating having been applied by high vacuum vapor deposition or by an electrolytic method. Such a coating, in particular one deposited by an electrolytic method, has a structure with a nanocrystalline grain size, i.e. a structure composed of grains, the mean dimensions of which are typically in a range of a few µm.

DE 10 2006 010 171 A1 describes a cage consisting of a two-sided band, one side of which is formed by a metal and the other side of which is formed by a wear- and corrosion-resistant plastic. Here, the plastic layer of the band faces outward, in particular toward the rolling elements or races.

JP 2006083965 A (abstract) describes a cage, the main body of which is composed of a synthetic resin, especially a phenolic resin or a PEEK resin, in which carbon nanoparticles, especially carbon nanotubes or nanofibers, are uniformly embedded.

JP 2006300257 A (abstract) describes a cage, the main body of which is composed of a resin compound containing carbon nanotubes.

DE 10 2005 051 914 A1 describes a cage, into the polyamide main body of which silicon dioxide particles with a particle size of between 1 nm and 50 nm are incorporated. Although these particles reinforce the main body of the cage, they also make it brittle.

JP 2005024025 A (abstract) describes a cage as a moving element of a bearing, the cage having a main body composed of silicon carbide, on which a coating of carbon nanotubes is arranged.

JP 2004308877 A (abstract) describes a cage for a rolling contact bearing, the main body of which is manufactured from a resin compound containing a synthetic resin and containing 1 to 50% by weight of carbon nanotubes.

WO 2004/090361 A1 proposes coating the rolling elements of a bearing with a nanocomposite material.

JP 2007177842 A (abstract) describes a cage, the body of which is provided in the region of the contact surfaces with a porous resin coating with a thickness of from 5 to 500 µm filled with lubricating oil.

WO 2007/014729 A2 describes a cage with a main body and a two-layer coating, the lower layer of the coating being composed of metals such as chromium, molybdenum, aluminum, titanium or tungsten and the outer layer of the coating comprising or being composed of fullerene-type carbon nitride (FL-CNx).

U.S. Pat. No. 6,994,475 B2 describes a cage for a rolling contact bearing with a main body composed of steel, which is covered with a four-layer coating, at least in the region of the contact surfaces. The first layer of the coating, which is connected to the main body, is composed of a metal such as chromium, titanium or silicon with a thickness of less than about 1 µm; the second layer is composed of a wear-resistant material such as a nanocomposite, in particular metal carbides with grain sizes of a few nm; the third layer is composed of a material such as chromium nitride, and the fourth, outer, layer of the coating is composed of a solid lubricant such as boron nitride, graphite or PTFE with a thickness of up to 5 µm.

WO 2006/066010 A2 describes a sports article, especially a bat for sports involving the use of a ball, sections of the body of which are composed of solid metal with a structure with a nanocrystalline grain size.

US 2006/0135282 A1 describes various objects composed of a light material, especially a polymer, which are covered with a nanocrystalline coating composed of a metal. The objects concerned are a shaft of a golf club, a munitions container, and components of a motor vehicle. This publication furthermore refers to a method for coating a main body composed of a plastic by means of a wet chemical electrosynthetic method, in part also through reference to publications U.S. Pat. Nos. 5,352,266 and 5,433,797.

In another method, known by the name 'MetaFuse', objects having a main body composed of plastic, in particular a thermoplastic, are provided, by means of an electrosynthetic method that does not involve the production of nanoparticles, with a coating of nanocrystalline metal, in particular composed of nickel or iron-nickel alloy, completely surrounding the main body.

OBJECT OF THE INVENTION

It is the object of the invention to reinforce a cage with a main body composed of plastic and at the same time to improve it in terms of its mechanical stability, wear resistance and corrosion resistance.

SUMMARY OF THE INVENTION

According to the invention, this object is achieved by a cage as claimed in claim 1.

The structure of the metal coating of the cage, at least sections of which are designed as a structure with a nanocrystalline grain size, has enhanced characteristics in terms of mechanical properties such as tensile strength and wear resistance in comparison with a coating that has a structure with grains of mean dimensions of the order of a few µm. The cage is therefore significantly stronger without becoming more brittle. In particular, the structure with the nanocrystalline grain size is very homogeneous and dense, with the result that only a very small number of spatially limited defects, at which external forces or aggressive media can act, occur.

Overall, the cage can be of lightweight configuration and the main body composed of plastic can be manufactured quickly and economically by a large number of known forming methods, without removal of material.

Provision is preferably made for the coating to be provided in the region of the contact surfaces. The coating may be restricted to the area of contact between the body of the cage and the bearing rings or rolling elements, for example, thus exploiting the wear-reducing properties of the structure with the nanocrystalline grain size. Owing to the improved thermal conductivity of the metal coating, the absorption of heat into the body of the cage is reduced, thus enabling the cage to be used especially at higher speeds of rotation. Even if provided only in sections, the coating stabilizes the main body of the cage, at least in part.

Provision is preferably made for the coating to cover the main body completely, and the coating thus surrounds the body of the cage overall as a mechanically stabilizing sheath. Where the coating is provided in the contact area of the cage, there is a reduction in wear.

As materials for the cage it is possible to use plastics which, in this specific use, are as such unsuitable on their own as cage materials, owing to their low strength and chemical resistance. In concrete terms, it is possible to replace the plastics currently used by less expensive plastics, thus widening the range of materials that may be considered for the main body.

Owing to the improved metallic conductivity of the structure with the nanocrystalline grain size, it is possible to use cages at higher temperatures.

Provision is preferably made for the coating to have a thickness of less than about 300 μm. A coating with a thickness of less than about 300 μm is sufficient to give it adequate intrinsic rigidity and stability as a covering completely surrounding the main body. Even if the coating does not surround the main body completely but only covers it in sections, it is possible to achieve mechanical stabilization of the cage. Moreover, design modifications to the coated cage in comparison with the uncoated cage are not yet required.

Provision is preferably made for the nanocrystalline grains of the structure to have a maximum dimension of less than about 100 nm. It is particularly preferable if the grains have maximum dimensions of about 10 nm or a few dozen nm. Grains of this kind give a dense structure with improved mechanical and chemical properties in comparison with larger grains having mean dimensions of a few micrometers.

Provision is preferably made for the metal to be an iron alloy or an alloy based on titanium or nickel. It is a known property of the metal alloys mentioned that they can be deposited rapidly and easily as a structure with a nanocrystalline grain size by electrosynthetic means.

Provision is preferably made for the plastic to be a thermoplastic. Owing to their low mechanical stability at a temperature of about 130° C., thermoplastics are not very suitable as a material for a cage but, as an essentially self-supporting sheath connected to the main body, the intrinsically stable coating composed of the metal having the structure with the nanocrystalline grain size surrounding the main body makes it possible to obtain a cage with adequate strength, even at relatively high temperatures. As a material for the main body it is possible especially to use thermoplastics which, without a coating, would not be suitable as a material for the cage owing to inadequate dimensional stability at higher temperatures. It is furthermore possible to use cages with a main body composed of a thermoplastic at higher temperatures.

Provision is preferably made for the coating to have been applied to the main body by an electrochemical method. No nanoparticles are produced during the process, thus making it possible to eliminate a potential environmental hazard due to the nanoparticles.

Further advantages and features of the invention result from the dependent claims and from the description of preferred illustrative embodiments.

The invention is described and explained in greater detail below with reference to illustrative embodiments.

DETAILED DESCRIPTION OF THE DRAWING

Figure 1:
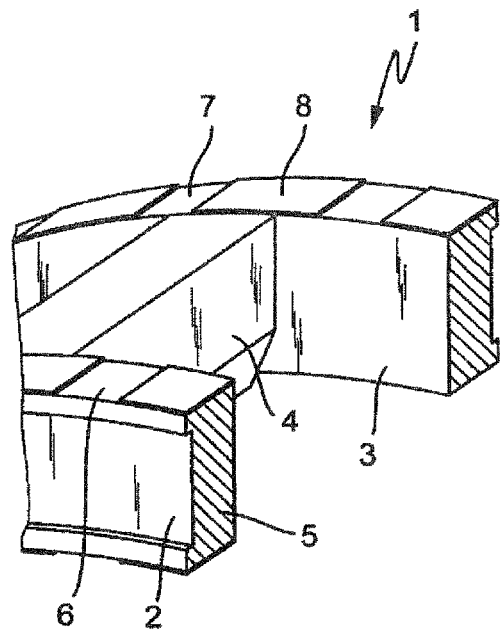
FIG. 1 shows a perspective view of a portion of a first illustrative embodiment of a cage according to the invention.

FIG. 1 shows a portion of a cage 1 for a rolling contact bearing, which comprises a first ring 2, a second ring 3 and bars 4 connecting the two rings 2, 3.

The main body 5 of the cage 1 is designed as a one-piece injection molding composed of a plastic. The first side face 6 of the first ring 2 and the first side face 7 of the second ring 3 are each designed as a contact surface between the cage 1 and a race of the rolling contact bearing (not shown specifically).

Provided in the region of each of the two contact surfaces 6, 7 is a coating 8, which is formed only in sections in the circumferential direction of the two rings 2, 3 and connects the two edges of the two side faces 6, 7 of the two rings 2, 3 in the axial direction. The coating 8 is composed of a metal, especially a nickel alloy, with a structure with a nanocrystalline grain size projecting by about 300 μm above the adjoining uncoated region of the respective side face 6, 7. In this case, contact between the two rings 2, 3 and the bearing ring of the rolling contact bearing no longer takes place along the entire side face 6, 7 but only in the region of the coating 8, where the wear-reducing properties of the structure with the nanocrystalline grain size take effect.

The coating 8 surrounds the main body 5 of the cage 1 only in sections, in the manner of a support ring. This mechanically stabilizes the main body 5 and hence the cage 1 overall.

The coating 8 itself has been applied to the main body 5 by an electrochemical method, with those sections of the surface of the main body 5 which are not supposed to receive a coating 8 having been covered beforehand.

Figure 2:
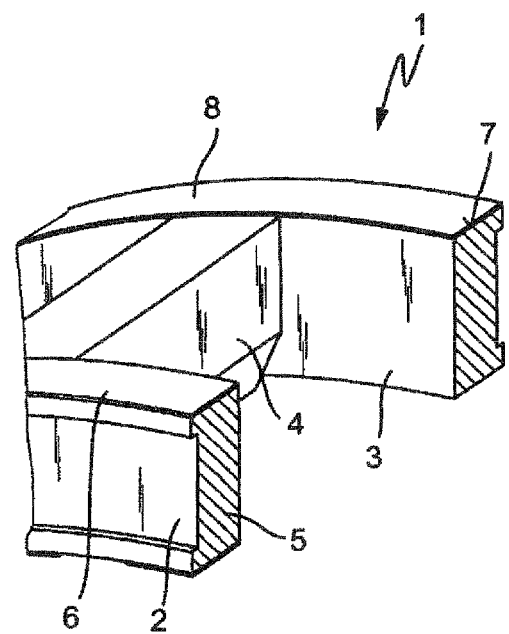
FIG. 2 shows a perspective view of a portion of a second illustrative embodiment of a cage according to the invention.

FIG. 2 shows a cage 1 with a main body 5 composed of a plastic, to the contact surfaces 6, 7 of the two side rings 2, 3 of which a coating 8 composed of a nickel alloy with a structure with the nanocrystalline grain size is applied in such a way that the respective coating 8 runs completely around the side ring 2, 3 in the region of the contact surface 6, 7.

In the two illustrative embodiments described above, the coating 8 was in each case applied by an electrochemical method. It is self-evident that the nanocrystalline grain size of the structure of the coating 8 can also be brought about by other methods, especially deposition from the gas phase (CVD, PVD) or by sputtering.

The respective coating 8 does not necessarily have to be arranged directly on the surface 8 of the main body 5; for example, it is possible to make provision for the coating 8 to be applied to a substrate which is then, in turn, applied, e.g. adhesively bonded, as a thin film to the surface of the main body 5. Here, the substrate having the coating 8 can be produced independently of the main body 5 and applied subsequently, e.g. only when required.

In the two illustrative embodiments described above, the coating 8 covered the main body 5 only in sections in the region of the contact surfaces 6, 7 of the two rings 2, 3. It is self-evident that the coating 8 can also be provided in the region of the pockets which hold the rolling elements. It is furthermore self-evident that the coating 8 can also be designed to cover the entire surface of the main body 5. In the latter case, the coating 8 imparts significantly improved mechanical stability to the cage 1.

In the first illustrative embodiment described above, the coating 8 was formed by sections of sectionwise construction that were substantially rectangular in plan view and projected beyond adjoining uncoated sections. It is self-evident that the coated sections can also have a shape that deviates from the rectangular form; for example, the coated sections may be formed or arranged in such a way that a conveying effect for lubricant in the direction of the rolling elements arises. In a plan view of the side faces 6, 7 of the side rings 2, 3, this would be the case, for example, if the coated sections were of trapezoidal configuration or had a herringbone pattern. Here, the coating 8 also contributes at least indirectly to reducing friction.

LIST OF REFERENCE SIGNS

1 Cage
2 First ring
3 Second ring
4 Bar
5 Main body
6 First side face of the first ring
7 First side face of the second ring
8 Coating

The invention claimed is:

1. A cage for rolling elements of a bearing, comprising:
a main body composed of plastic and operatively arranged between an outer ring and an inner ring, said main body having at least one contact surface facing said outer ring; and,
a noncontinuous coating composed of a metal and fixed to said at least one contact surface of said main body;
wherein at least a portion of said noncontinuous coating is a structure with a nanocrystalline grain size.

2. The cage as recited in claim 1, wherein said coating has a thickness of less than approximately 300 μm.

3. The cage as recited in claim 1, wherein said nanocrystalline grain size is less than approximately 100 nm.

4. The cage as recited in claim 1, wherein said metal is an iron alloy or an alloy based on titanium or nickel.

5. The cage as recited in claim 1, wherein said main body is made of a thermoplastic.

6. The cage as recited in claim 1, wherein said coating is applied to said main body by an electrochemical method.

7. A cage for rolling elements of a bearing, comprising:
a main body composed of plastic and operatively arranged between an outer ring and an inner ring, said main body having at least one contact surface facing said outer ring; and,
a noncontinuous coating composed of a metal and fixed to said at least one contact surface of said main body;
wherein at least a portion of said noncontinuous coating is a structure with a nanocrystalline grain size and
wherein said coating is restricted to surfaces in contact with said outer ring.

8. A cage for rolling elements of a bearing, comprising:
a main body composed of plastic and operatively arranged between an outer ring and an inner ring, said main body comprising:
a first ring having a radially outer face which is a first area of contact between said cage and said outer ring;
a second ring having a radially outer face which is a second area of contact between said cage and said outer ring; and,
bars connecting said first and second rings; and,
a noncontinuous coating composed of a metal and fixed to said first and second areas of contact of said main body;
wherein at least a portion of said noncontinuous coating is a structure with a nanocrystalline grain size and
wherein said coating is restricted to said areas of contact with said outer ring.

9. A cage for rolling elements of a bearing, comprising:
a main body composed of plastic, said main body comprising:
a first ring having a first radial outer face arranged between said cage and bearing rings of said bearing;
a second ring having a second radial outer face arranged between said cage and said bearing rings of said bearing; and
at least one bar connecting said first and second rings; and,
a coating composed of a metal and completely covering the radially outer faces of the first and second ring in a circumferential direction and not covering said at least one bar connecting said first and second rings;
wherein at least a portion of said coating is a structure with a nanocrystalline grain size.

* * * * *